United States Patent
Tung

(10) Patent No.: US 6,711,913 B1
(45) Date of Patent: Mar. 30, 2004

(54) AIR CONDITIONER WITH SELF-PRODUCING OXYGEN CAPABILITY

(75) Inventor: Yin-Hsiang Tung, Tai Ping (TW)

(73) Assignee: Shao-Shih Huang, Taipei (TW)

( * ) Notice: Subject to any disclaimer, the term of this patent is extended or adjusted under 35 U.S.C. 154(b) by 0 days.

(21) Appl. No.: 10/251,971

(22) Filed: Sep. 23, 2002

(51) Int. Cl.⁷ .............................. F24F 3/16; F25D 23/12
(52) U.S. Cl. ............................................. 62/262; 62/78
(58) Field of Search ..................... 62/262, 78, 640, 62/303

(56) References Cited

U.S. PATENT DOCUMENTS 4,896,514 A * 1/1990 Sugiyama et al. ............. 62/78
6,427,484 B1 * 8/2002 Choi et al. ..................... 62/640

FOREIGN PATENT DOCUMENTS

| JP | 01041732 A | * 2/1989 | ............. F24F/1/02 |
|---|---|---|---|
| JP | 03217732 A | * 9/1991 | ............. F24F/1/02 |
| JP | 06341667 A | * 12/1994 | ............. F24F/1/00 |
| WO | WO98/53258 | * 11/1998 | ............. F24F/5/00 |

* cited by examiner

Primary Examiner—Chen Wen Jiang
(74) Attorney, Agent, or Firm—Rosenberg, Klein & Lee

(57) ABSTRACT

An air conditioner equipped with self-production oxygen capability comprises an oxygen machine in a space close to where a radiation fan is. The oxygen machine comprises an air compressor, a revolving valve and two oxygen filter units. This design provides air to the compressor for the process of compressing and flows through the revolving valve into the two oxygen filter units in different time scheme, the oxygen filter units filter oxygen from the air to be blown to an exhale of the air conditioner through pipelines, while dirty air flows through the inhale back to the revolving valve and is expelled out. The revolving valve arranges oxygen to be blown out through the oxygen filter units in sequence so as to maintain a constant oxygen output.

1 Claim, 6 Drawing Sheets

AIR CONDITIONER WITH SELF-PRODUCING OXYGEN CAPABILITY

Field of the Invention

This invention relates to an air conditioner, and more particularly, to an air conditioner enables to produce oxygen to be blown out into a room.

BACKGROUND OF THE INVENTION

Air conditioners have been widely used in modern countries, in particular in the areas such as offices, restaurants, conferences and homes. The area will close their door or entrance to prevent cool air from expelling out of the room. This also stores the carbon dioxide, which will causes a side effect when inhaling too much by human being. The more series situation will even cause human's life. Therefore, how to maintain a cool room with enough oxygen has been an important issue.

In view of the above concerns, the inventor has derived a renovated air conditioner, which produces oxygen while cooling the temperature of the room.

SUMMARY OF THE INVENTION

It is the primary object of the present invention to provide an air conditioner with self-producing oxygen capability, which produces oxygen and expels carbon dioxide to provide with fresh and healthy air in an air conditioning room It is another object of the present invention to provide an air conditioner with self-producing oxygen capability, which is safe and energizes people in the air conditioning room.

It is a further object of the present invention to provide an air conditioner with self-producing oxygen capability, which is cost effectiveness.

DETAILED DESCRIPTION OF THE PREFERRED EMBODIMENT

Figure 1:
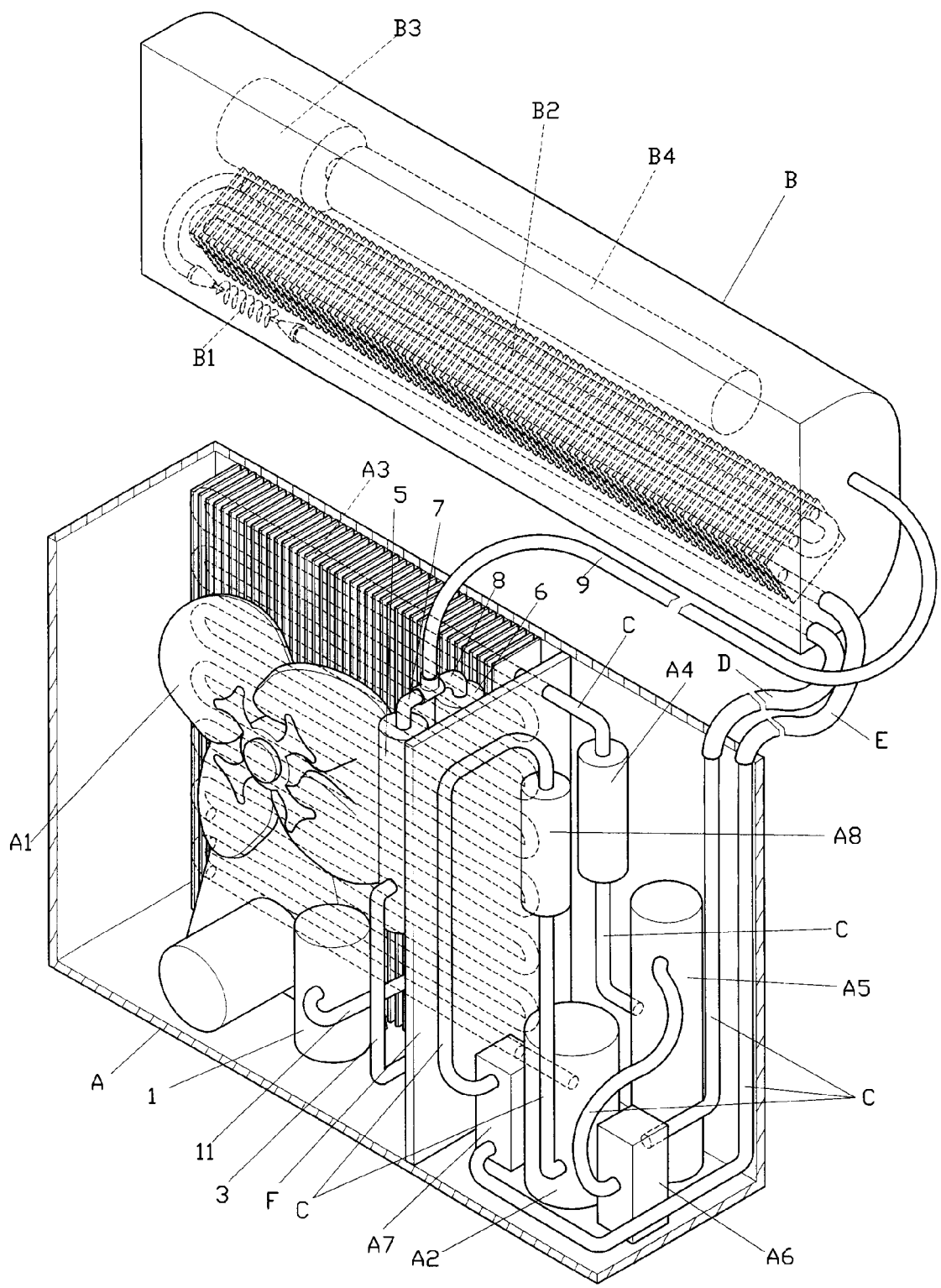
FIG. 1 is a perspective view of the present invention.
Figure 2:
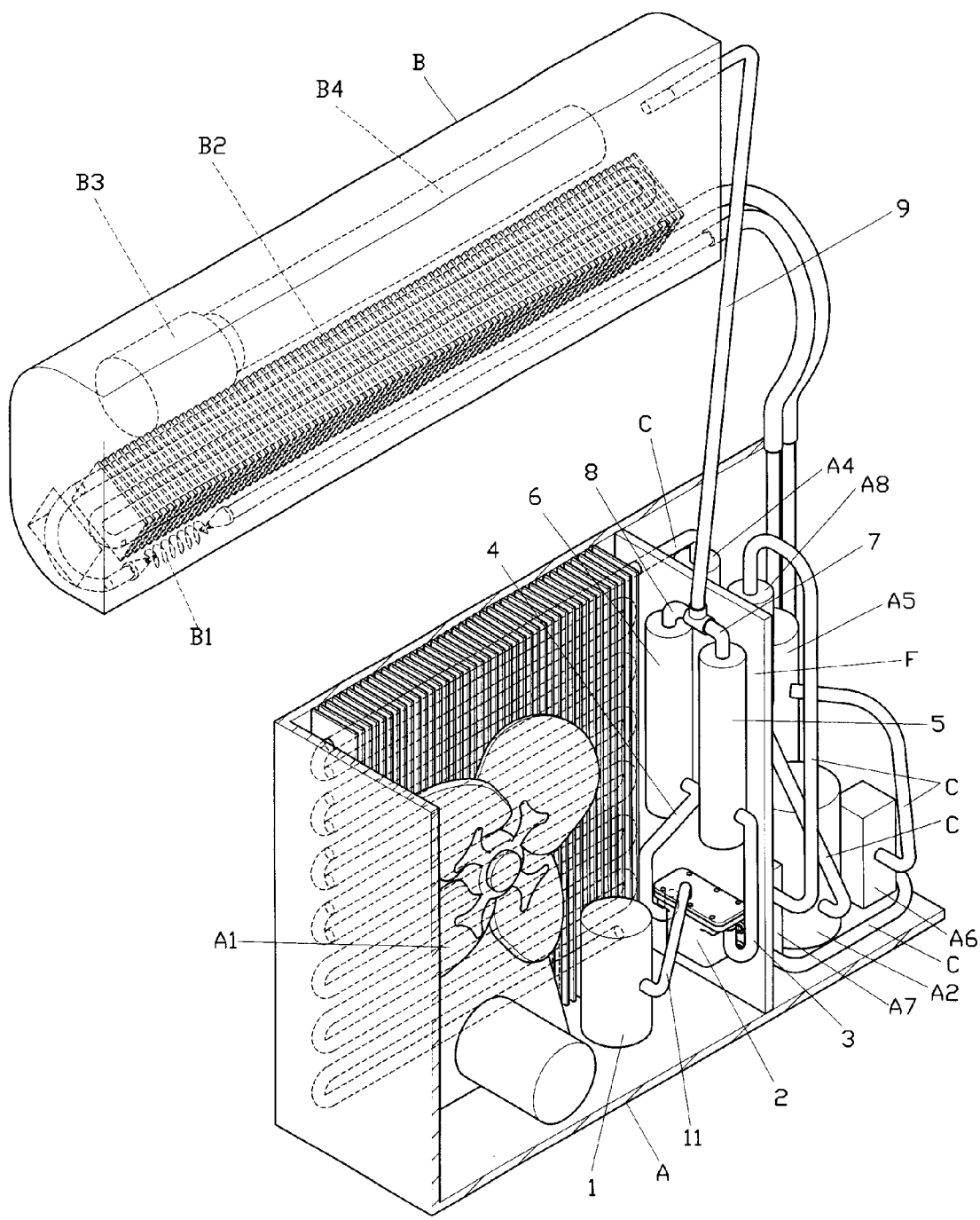
FIG. 2 is another perspective view of the present invention.

The air conditioner with self-producing oxygen capability of the present invention is based upon a separated-type air conditioner, which comprises an outdoor unit A and an indoor unit B coupled with guiding pipes C, as shown in FIGS. 1 and 2. The outdoor unit A comprises an oxygen machine set in a space where a radiation fan Al is located. The outdoor unit A further comprises an air compressor A2, which transports coolant to a cooler A3. The cooler A3 is located by the radiator fan Al and is connected to a dryer A4, a reservoir A5 and a check valve A6, sequentially, and then through a pipeline D to a capillary B1 of the indoor unit B. This connection then goes through the capillary B1 to a dryer B2. The indoor unit B further comprises a blown fan motor B3 which drives a turbo fan B4, and the dryer B2 is connected to another pipeline E back into the outdoor unit A and to a separator A8 through a check valve A7. The separator A8 then connects to the compressor A2.

The outdoor unit A is divided with a space where the radiating fan A1 is located by a partition F to secure an oxygen machine thereat. The oxygen machine comprises an air compressor 1, a revolving valve 2 and at least two oxygen filter units 5 and 6. The air compressor 1 connects through an inhale pipe 11 to the revolving valve 2, which then connects to the two oxygen filter units 5 and 6 through a pair of air pipes 3 and 4. The oxygen filter units 5 and 6 then transport oxygen through a pair of transporting pipes 7 and 8, respectively to an outer pipe 9 connected to an air exhale of the indoor unit B.

Figure 3:
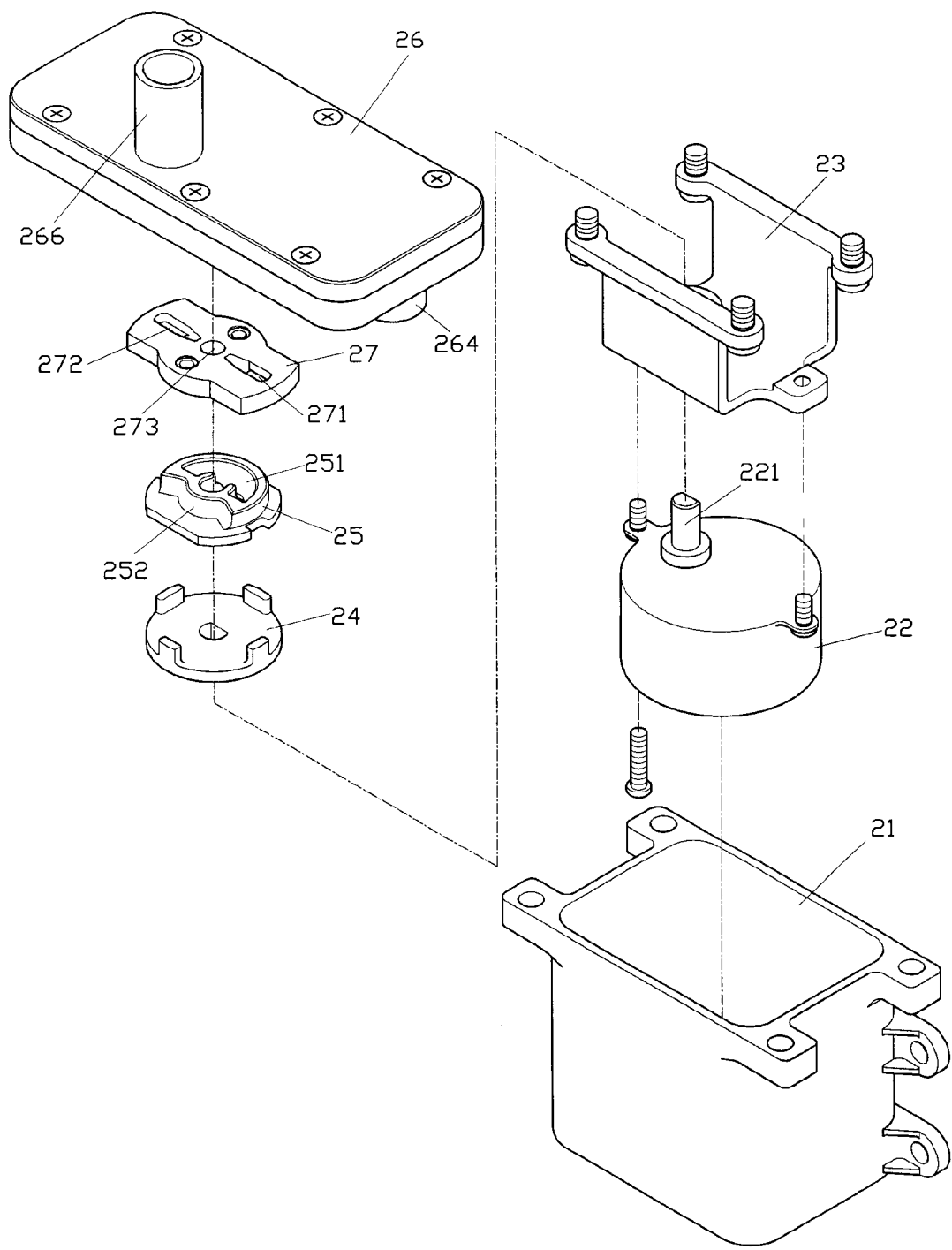
FIG. 3 is an exploded view of a revolving valve of an oxygen machine of the present invention.
Figure 5:
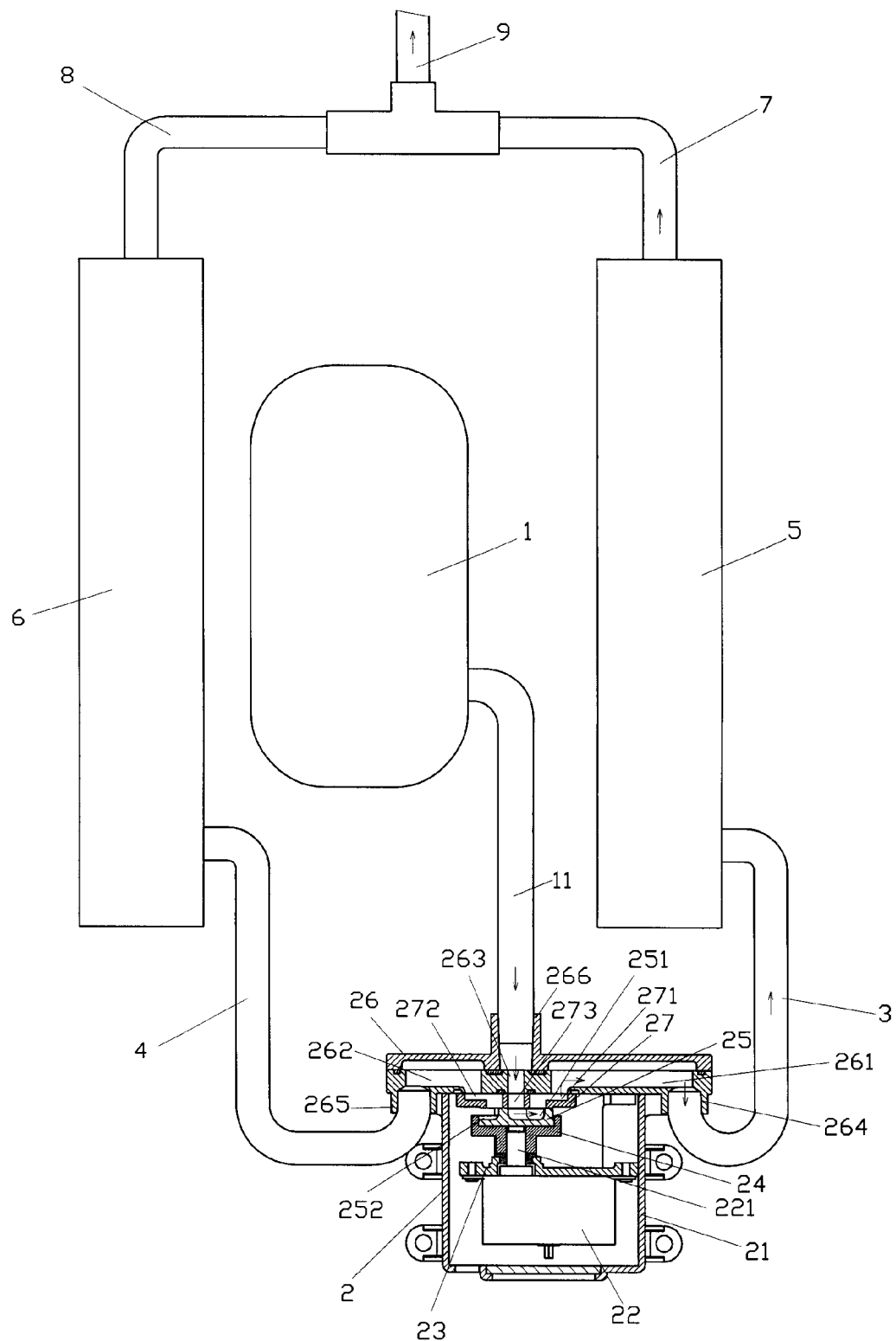
FIG. 5 is a schematic diagram of the present invention showing air inhale.

The revolving valve 2, as shown in FIGS. 3 and 5, comprises a base 21, which receives a motor 22, a fixture 23, a disc 24, and a revolving disc 25 in sequence, and is sealed by a cap 26 on the top thereof. The motor 22 is secured to the bottom of the fixture 23 with a shaft 221 extending through and meshing with the disc 24 and the revolving disc 25. The cap 26 comprises a lid 27 at its inner bottom end, which seals the revolving disc 25 to the lid 27 and is driven by the shaft 221 of the motor 22 to rotate. Furthermore, the revolving disc 25 comprises an air chamber 251 on the top corresponding to the lid 27, and a notch 252 next to the air chamber 251.

The lid 27 further comprises a pair of circulating valves 271 and 272 at respective sides corresponding to the air chamber 251 and the notch 252, and an air inhale hole 273 at the center thereof.

The cap 26 comprises a pair of guiding troughs 261 & 262 and an air inhale hole 263 corresponding with the circulating troughs 271 & 272 and the air inhale hole 273 of the lid 27, respectively. The guiding troughs 261 & 262 and the air inhale hole 263 extends outwardly of the lid 26 to form a pair of guiding pipelines 264 and 265, and an air inhale pipeline 266. The guiding pipelines 264 and 265 are connected with the oxygen filter units 5 and 6 through the air pipes 3 and 4 whereas the air inhale pipeline 266 is connected to the air compressor 1 through the inhale pipe 11.

Figure 4:
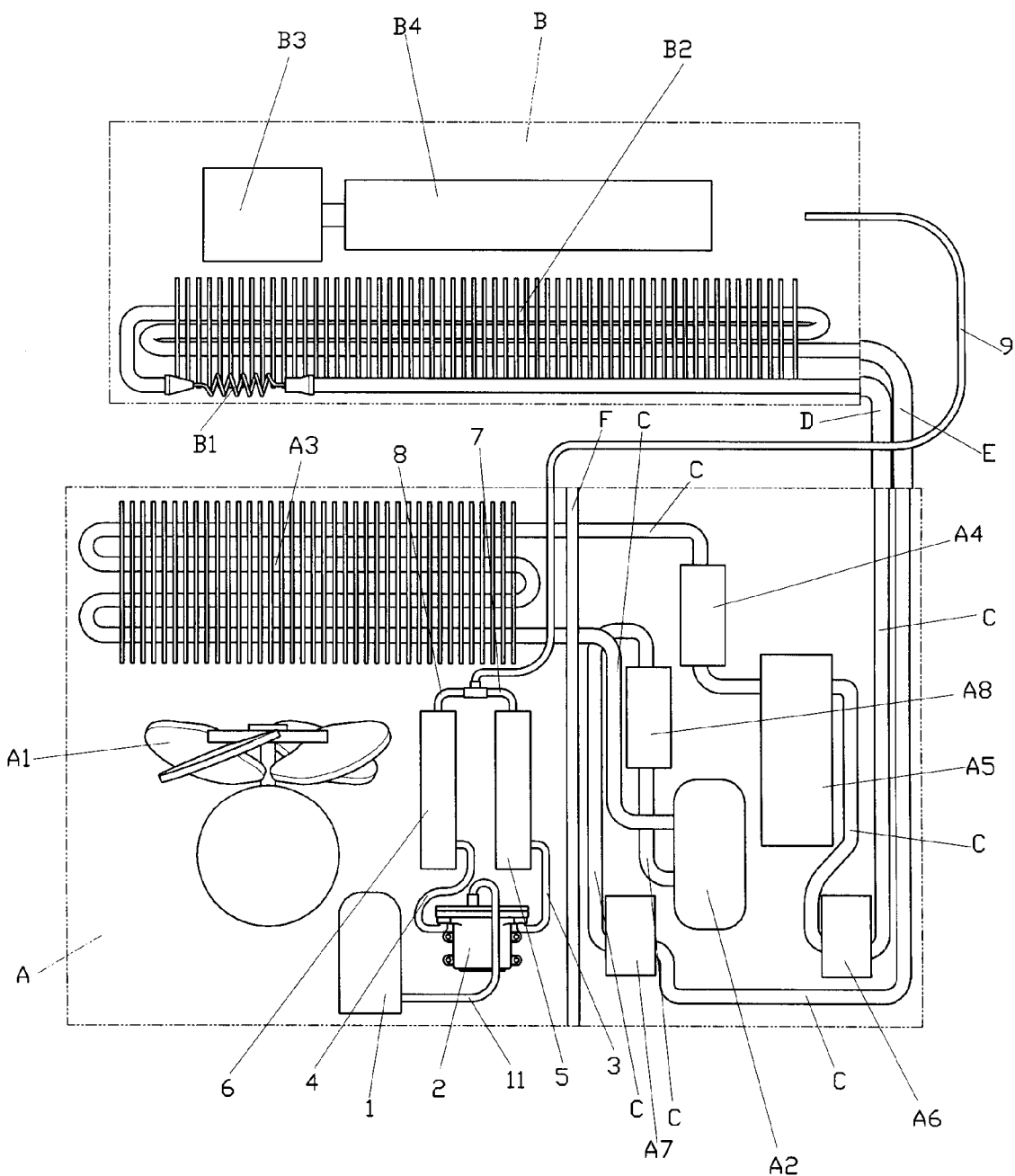
FIG. 4 is a schematic diagram of the air conditioner producing oxygen of the present invention.
Figure 6:
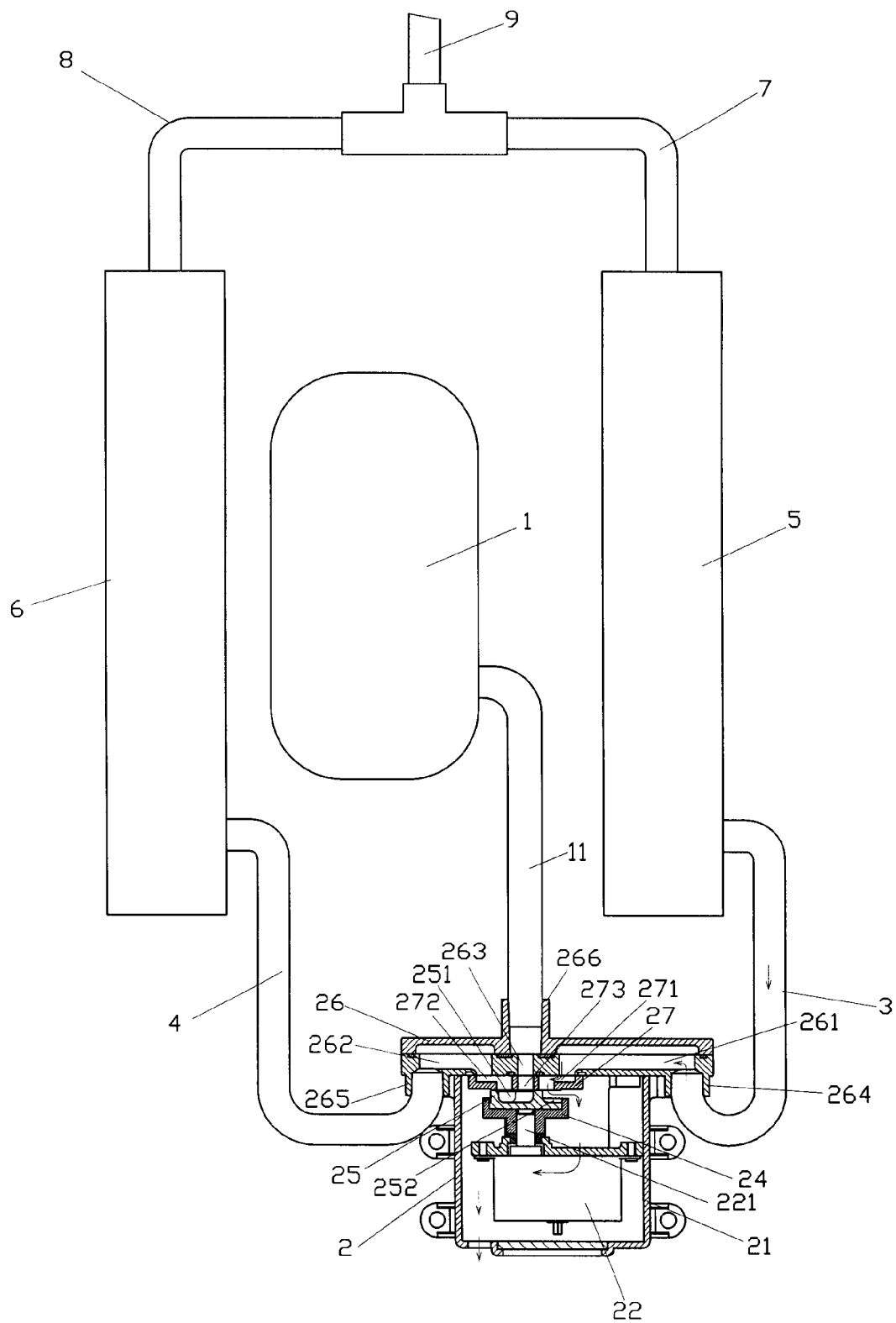
FIG. 6 is a schematic diagram of the present invention showing air exhale.

Operation of the present invention, as shown in FIGS. 4 and 5, is as follows, an ordinary air conditioner outputs cool air into a room, this process actuates the oxygen machine in the outdoor unit A. The oxygen machine send compressed air from the air compressor 1 through the air inhale hole 263 of the cap 26 of the revolving valve 2, and through the air inhale hole 273 of the lid 27 to the revolving disc 25, which causes the revolving disc 25 to spin. When the air chamber 251 lines up the right circulating valve 272 of the lid 27, the air flows through the air inhale hole 273 into the air chamber 251, and through the circulating valve 271 at the right side of the lid 27 into the guiding trough 261 at the right side of the cap 26, and then flows to the guiding pipeline 264 and the air pipe 3. The air will later be guided into the oxygen filter units 5, which separates oxygen, water and other elements. The oxygen will be sprayed into the room while the other elements are guided through the air pipes 3 and 4 back to its original path, as shown in FIG. 6. This path allows the exhaust air from the oxygen filter unit 5 to flow through the notch 252 of the revolving disc 25 and the opening of the circulating valve 271, thus air can not flow through the air chamber 251 and will be released into the base 21.

The air chamber 251 or the notch 252 of the revolving disc 25 corresponding to inhale and exhale of the left revolving valve 272 of the lid 27 is similar to the structure of the right side. This design enables to produce a continuous oxygen and by means of the revolving valve 2 to flow through the oxygen filter units 5 and 6 in different time scheme, and then blow outward into the room through the transporting pipes 7 and 8. This design allows the oxygen to flow at least from one of the oxygen filter units 5 and 6 at any time. Further, the air compressor 1 of the oxygen machine is located near the radiating fan A1, which acts as a cooling device to the compressor 1 as well.

I claim:

1. An air conditioner with self-producing oxygen capability comprising an oxygen machine located in a space where a radiation fan is secured, said oxygen machine comprising an air compressor, a revolving valve, and at least two oxygen filter units, wherein said air compressor receives air from said radiation fan and sends compressed air to said revolving valve, said revolving valve controlling air input into two oxygen filter units forming a constant supply of oxygen to a room, each of said two oxygen filter units having an oxygen output connected through a pipeline to an air outlet of said air conditioner for oxygen output, wherein filtered exhaust air being sent back to said revolving valve, said two oxygen filter units maintaining a constant input and output in a crossed manner, said revolving valve comprises a base receiving a motor, a fixture, a disc, and a revolving disc in sequence within said base and being sealed by a cap, said motor being secured at a bottom of said fixture with a shaft extending upwardly through and meshing with said disc and said revolving disc, a lid being secured immediately to a bottom of said cap to seal said cap tightly and being driven by said motor through said shaft to rotate, said revolving disc comprising an air chamber corresponding to said lid and a notch next to said air chamber, said lid comprising a pair of circulating valves at respective sides corresponding to said air chamber and said notch, said lid having an air inlet hole at a center portion thereof, said cap comprising a pair of guiding troughs and an inlet hole, said guiding troughs and said inlet hole extending outwardly of said cap to form two guiding pipelines and an inlet pipeline, and both said guiding pipelines being connected with said oxygen filter units with said inlet pipeline being connected to said air compressor.

* * * * *